(12) United States Patent
Thompson (10) Patent No.: US 6,718,698 B1
(45) Date of Patent: Apr. 13, 2004

(54) FIRE-BLOCKING HURRICANE-EARTHQUAKE FRIEZE PLATE

(76) Inventor: Thomas C Thompson, 92-543 Kokole Pl., Makakilo, HI (US) 96707

( * ) Notice: Subject to any disclaimer, the term of this patent is extended or adjusted under 35 U.S.C. 154(b) by 147 days.

(21) Appl. No.: 09/887,046

(22) Filed: Jun. 20, 2001

Related U.S. Application Data (63) Continuation-in-part of application No. 09/396,128, filed on Sep. 14, 1999.

(51) Int. Cl.[7] ................................................. E04B 7/04
(52) U.S. Cl. ........................ 52/92.2; 52/167.1; 52/712; 403/403
(58) Field of Search ..................... 52/167.1, 95, 94, 52/302.3, 302.1, 198, 199, 712, 92.2; 403/282, 403, 231, 188, 187, 286, 341

(56) References Cited

U.S. PATENT DOCUMENTS

| | | | |
|---|---|---|---|
| 3,423,898 A | * | 1/1969 | Tracey et al. ................. 52/92.2 |
| 3,777,649 A | | 12/1973 | Luckey |
| 4,126,973 A | | 11/1978 | Luckey |
| 4,184,416 A | * | 1/1980 | Koontz ............................ 52/95 |
| 4,410,294 A | | 10/1983 | Gilb et al. |
| 4,572,695 A | | 2/1986 | Gilb |
| 4,714,372 A | | 12/1987 | Commins |
| 4,897,979 A | * | 2/1990 | Colonias ........................ 52/712 |
| 4,932,173 A | * | 6/1990 | Commins .................... 403/403 |
| 4,972,635 A | * | 11/1990 | Wageman ........................ 52/94 |
| 5,007,216 A | | 4/1991 | Pearson |
| 5,150,982 A | * | 9/1992 | Gilb ............................. 403/403 |
| 5,319,896 A | | 6/1994 | Winger |
| 5,333,435 A | * | 8/1994 | Leek ............................. 52/712 |
| 5,335,469 A | | 8/1994 | Stuart |
| 5,370,577 A | | 12/1994 | Jonett et al. |
| 5,380,115 A | | 1/1995 | Colonias |
| 5,412,920 A | | 5/1995 | Hess |
| 5,560,156 A | | 10/1996 | McDonald |
| 5,561,949 A | | 10/1996 | Knoth |
| 5,570,545 A | | 11/1996 | Adams |
| 5,737,882 A | * | 4/1998 | Eckert et al. ................. 52/92.2 |
| 6,022,165 A | * | 2/2000 | Lin .............................. 403/170 |
| 6,101,780 A | * | 8/2000 | Kreidt .......................... 52/712 |
| 6,189,277 B1 | | 2/2001 | Boscamp |
| 6,230,467 B1 | * | 5/2001 | Leek ............................ 52/712 |

FOREIGN PATENT DOCUMENTS

| | | | | |
|---|---|---|---|---|
| GB | 2027477 | * | 2/1980 | ................... 52/712 |
| GB | 205697 | * | 2/1981 | ..................... 52/95 |
| GB | 2174124 | * | 10/1986 | ..................... 52/94 |
| JP | 04155039 | * | 5/1992 | ..................... 52/95 |

OTHER PUBLICATIONS

Building Performance: Hurrican Iniki in Hawaii FEMA FIA–23 p 37–39, 56 Undated.

\* cited by examiner

*Primary Examiner*—Lanna Mai
*Assistant Examiner*—Hanh Van Tran (57) ABSTRACT

An improved hurricane and earthquake connector for buildings that has a solid front face as a fire-stop, and lower part for attachment to the top plate or wall sheathing of a wall. Attached to either side of the front face are perpendicular rafter tabs for connection to adjacent roof rafters. Below the rafter tabs are double bends, spacers, and plate tabs for attachment to the top of the top plate. The double bends and spacers allow the front face to completely block the opening between adjacent rafters and the roof and top plate, even on houses having different heel heights between the roof arid top plate. Above the rafter tabs are perpendicular sheathing tabs that can attach to the roof with bolts. Along side the sheathing tabs are gussets, parallel and planer to the rafter webs, for additional strength. Bolts can connect the roof tie from above the roof to adjacent connectors effectively tying down the roof to the rafters, and top plate. The invention prevents a chimney-effect, and thereby prevents outside fires from entering the building, while also preventing damage from strong winds and seismic events.

17 Claims, 8 Drawing Sheets

FIRE-BLOCKING HURRICANE-EARTHQUAKE FRIEZE PLATE

BACKGROUND

Field of the Invention

This invention is a continuation-in-part of my previous invention in application Ser. No. 09/396,128, filed Sep. 14, 1999. This is an innovative connector that permanently connects the roof to the outside wall which creates buildings that are stronger and more resistant to hurricanes, earthquakes, and wildfires.

BACKGROUND

Description of Prior Art

Recent studies of wildfires indicate that the flames entered the house by vents along the eaves or soffits of a house. Studies of hurricane damage on wood-frame buildings indicate that extensive damage was generated to a house by strong winds, when the roof rafters or roof trusses were torn from the outside wall. Earthquakes can shake the walls and roof at different rates, because of the weight difference, which can cause the roof and wall to separate.

Roof sheathing ties all the rafters together on a wood frame house, and the roof sheathing ties all the roof trusses together when a masonry or wood-frame house is constructed with trusses. If the rafters or trusses rack or twist from the wind forces, the roof sheathing can detach from the roof allowing wind and rain to enter the house.

Roof sheathing that is tightly secured to the rafters or trusses and subsequently fastened to the walls, helps transfer uplifting forces to the walls and henceforth to the foundation. If the roof sheathing fails, the trusses collapse, and the walls usually fall down as they can not stand by themselves against strong winds.

Roof trusses can take tremendous compression pressure, but are usually weakly attached to the top plate of the wall by toe-nailing or prior art hurricane clips. During house construction, when a rafter or roof truss is attached to the erect wall, it is usually fastened by toe-nailing or driving a nail at an angle into a thin edge of the rafter and into the top plate.

Toe-nailing is a weak, but time honored way of constructing rafters and trusses. Driving a nail at an angle usually moves the rafter off it's correct location on the top plate. This invention forms a much stronger building connection without toe-nailing or fragile hurricane clips.

Wildfires

Studies of wildfires show that flames enter a house by vents along the eaves or soffits of a house. The ventilation spaces formed a chimney-effect that sucked the flames into the attic of the house. Even if the roof had fire-proof material on the outside, the flames were already inside the attic, burning from the inside. Spraying water or fire-fighting foam on the outside of the roof will not stop the flames after they have been sucked into the house through vents or other openings.

Some engineers feel that an attic does not have to be vented. The vent screens usually deteriorate over time, letting birds, bats, insects, and rodents into the attic. If a bush next to a house catches fire, even if only momentary, the flames can be sucked into the attic like a chimney. To prevent flames from entering the attic, the opening between the rafters, top plate, and roof sheathing must be tightly sealed off.

Hurricanes

Studies of damage after Hurricane Andrew show several problems with the attachment of roof rafters and roof trusses that this invention solves.

Roof overhangs act like wings, creating huge uplifting forces during strong winds. This uplift tears apart the rafters that are toe-nailed to the header or top plate. The uplift can also twist rafters and roof trusses weakening the toenailed connections and causing detachment. Roof sheathing can be improperly attached to the rafter, and is usually covered by the roofing material. If the roof sheathing becomes detached from the underlying rafter, the house will be severely weakened, and rain will ruin everything inside.

A hurricane's wind and pressure can push in a wall, suck out a wall, push a wall laterally, lift the rafter from the top plate, and separate the roof sheathing and roofing material from the rafter.

A Federal Emergency Management Agency (FEMA) Publication, FIA-23, "Building Performance: Hurricane Iniki-in Hawaii" shows undersized and improperly attached metal fasteners (FIGS. 26–27). Because of the shape of all roofs, wind blowing across a roof tends to lift the roof off the walls as shown in FIA-23, FIG. 48. The most important tie in an existing house is between the rafter and top plate or roof truss and top plate. Any uplifting wind force on the roof must be transferred to the walls.

Another problem with home construction is on misinstallation of prior art hurricane clips. After Hurricane Andrew, there were many examples of careless and inferior attachment of hurricane clips or they were entirely missing. One company has visited new construction sites and documented many examples of shoddy and incorrect application of their products.

Earthquakes

During an earthquake, the floor, wall, and roof diaphragms undergo shearing and bending. The shear forces from the roof boundary members are transferred to the top of the shear wall by way of toenails to the top plate. To withstand and transfer the shear loads, the connection between the roof and wall must be strong.

Steel connectors, between different components of a wood-frame buildings superstructure, provide continuity so the house will move as a unit in response to seismic activity (Yanev, 1974).

The outside wall sheathing provides lateral stability to the walls, preventing racking. The sheathing also absorbs and transfers earthquake forces by becoming a shear wall. In order for the wall to perform as a shear wall, it must stay upright and intact. This invention makes a strong and rigid connection between the roof rafters or trusses, top plate, and wall sheathing.

Construction

Many houses are still built with the time-honored method of toe-nailing the rafter or roof truss to the top plate of the wall. This weak method drives a nail at a steep angle through a thin edge of the rafter into the top plate. Any uplifting force splits the rafter or pulls the nail out. This method was used in most places until after Hurricane Andrew devastated southern Florida.

Exact measurements are usually performed to get the rafters in the correct location, but toe-nailing or striking the rafter at a steep angle shifts the rafter even when striking it again by nailing on the opposite side. Installing this invention can cut measuring time drastically and eliminates toe-nailing so rafters or trusses are exactly on-center. Hurricane clips have been used in the past, but they are thin, weak and only tie a thin edge of the rafter and top plate together, and don't tie adjacent rafters together.

Prior Art

A number of connectors have been developed to tie together the structural members of a house under construction. Up until this invention, nobody had seen how to make a connector that could tie the roof rafters together and to the wall top plate, exactly space out the distance between rafters, prevent chimney-effect of fires into the attic, tie into the roof sheathing, prevent lateral movement during an earthquake, prevent thrusting when heavy loads are placed on the roof, and prevent uplift during a hurricane.

My co-pending application, Ser. No. 09/794,998 shows a frieze board that is retrofit to the roof rafters, the top plate, and outside wall sheathing. It provides ventilation and prevents uplift, thrusting, and lateral movement. My co-pending application Ser. No. 09/516,655 and related applications show other roof plates for tying down the roof sheathing.

A leading manufacturer of wood construction connectors, the Simpson Strong-tie Company, shows no connectors in their catalog that tie the roof rafters to the wall top plate, while spacing out the distance between rafters, preventing fire from entering an attic, and tying into the roof sheathing to prevent lateral movement during an earthquake and uplift during a hurricane.

There are a number of connectors that block fires from spreading from one floor to the next, by blocking flames from rising between studs. Boscamp's U.S. Pat. No. 6,189,277 is a firestop for metallic stud framing.

There are several connectors for rafters that provide ventilation, but they don't prevent the chimney-effect of fire entry into the attic. Jonett, et al's U.S. Pat. No. 5,370,577, and Luckey's U.S. Pat. Nos. 3,777,649 and 4,126,973 vent the attic.

Hess's U.S. Pat. No. 5,412,920 spaces beams laterally. Pearson's U.S. Pat. No. 5,007,216 is an insulation stop at the top plate.

There are a number of ties that fasten the rafter to the top plate while a house is being constructed including: Knoth U.S. Pat. No. 5,561,949, McDonald U.S. Pat. No. 5,560,156, Colonias U.S. Pat. No. 5,380,115, Stuart U.S. Pat. No. 5,335,469, Colonias et al U.S. Pat. No. 5,109,646, Commins U.S. Pat. No. 4,714,372, Gilb U.S. Pat. No. 4,572,695, and Gilb et al U.S. Pat. No. 4,410,294.

These are good inventions, but they do not tie two rafters together or block fire from entering a house. The prior art hurricane clips provide little lateral strength, even when using a left and right. The prior art cannot tie the roof sheathing to the underlying top plate and roof rafter. They cannot prevent the roof sheathing from being blown off during strong winds of a hurricane. They do not prevent the roof sheathing from splintering and disconnecting during earth tremors.

There are several retrofit apparatus for securing roofs using cables. Adams U.S. Pat. No. 5,570,545 and Winger U.S. Pat. No. 5,319,896 are both temporary, meaning a homeowner must be home to deploy and anchor the ephemeral cables. The anchors can only be as secure as the nearby soil and the cables do not prevent the walls from bowing or blowing out.

Prior art connectors relied on angled nailing, to provide lateral support, which is complex to manufacture, and very difficult to install around structural beams. My invention effectively ties together adjacent rafters or roof trusses to the top plate to form a strong connection between the rafters, top plate, and the roof sheathing.

OBJECTS AND ADVANTAGES

Accordingly, several objects and advantages of my invention are that it helps secure the roof and wall of a building to make the building a solid unit and helps prevent it from being destroyed by hurricanes, earthquakes, and wildfires.

This invention helps prevent the roof from being blown off the walls of building. It keeps the roof rafters and roof trusses tightly secured to each other and to the top plate of the wall.

This invention helps prevent the roof rafters and roof trusses from twisting during strong winds, thereby preventing detaching of the roof material and roof sheathing. It stiffens the edge of the roof and the top of the wall, helping to transfer lateral loads to the whole roof and walls.

This invention makes the top of the wall very sturdy and helps make the outside wall and roof into stable shear-walls, absorbing and transferring lateral forces into the foundation.

Many older homes were constructed with the best materials and by competent carpenters, but used the time-honored method of connecting the rafter to the top plate with nails driven into the edge of the rafter. This weak connection, called toe-nailing, is still in use today. Even if prior art hurricane clips were used in construction, the homeowner can't tell, and those clips don't tie adjacent rafters together to the wall, or tie the roof sheathing to the wall.

Mounted on the top plate, rafters, and roof sheathing, this invention resists uplift, one of the most destructive forces of a hurricane. Mounted on the top plate and wall sheathing, the invention helps prevents the top of the wall from bowing out by the extreme negative pressure of a hurricane.

During an earthquake, when this connector is mounted on the roof and walls, they will help make the walls and roof stiffer and therefore into shear-walls. The secured wall-roof junction will absorb and dissipate earth movements, without becoming detached from each other.

This would improve the house beyond existing building codes, as sheet metal joints have been proven to perform better than nailed joints during hurricanes and earthquakes. Existing building codes have no knowledge of how to tie the roof sheathing to the top plate.

Another object of this invention is to prevent the entry of fire into the attic from wildfires. Studies of recent wildfires have shown that houses having fireproof roofs still had their roofs on fire, even though there was no visible entrance for flames. Vents on the eves or soffits formed a chimney-effect, drawing in the flames. This invention seals the area between the roof and wall to prevent the entry of fire, while preventing uplift and lateral movement.

Yet another advantage of this invention is during earthquakes, nails can sometimes bend with the movements of the house, but screws often break. Even though screws hold tighter than nails and provide a tight connection against uplifting forces from hurricanes, they are less resistant against earth movements. This invention absorbs and transmits most of the forces during an earthquake and hurricane so nails and/or screws can be used as fasteners.

Another advantage is that since the invention absorbs and transfers earthquake and hurricane forces, less nails and nailing could be used. Also, screws could be used in the invention in earthquake areas with less fear that the heads will shear off.

Still another advantage is that with the roof rafters and roof trusses better able to resist twisting, roof sheathing will stay firmly attached and roofing material will now have a better chance of staying on during strong winds and earth movements. In addition, with the sheathing now firmly connected, new materials may be attached to the roof, such as solar electric panels, without fear of them being blown or shaken off.

In areas with brush or forest fire danger, fire-proof material or heavy material, such as long-lasting tile, stone or metal, can now be applied to the roof with less danger of being blown or shaken off during earth tremors or high winds. The invention resists thrusting, or the weight of the roof pushing outward on the wall, since the heavy weight of the roof is now securely attached to the wall.

Earth tremors and hurricanes always destroy the weakest parts of a house. By making the vertical walls and roof envelope into a strong unit, there will be less damage.

It is a further object of this invention that it easily, quickly, and economically protects houses from the destructive forces of earthquakes, hurricanes, and wildfires. It is a still further object that the connectors and fasteners are strong, attractive, permanent, functional, uncomplicated, simple to manufacture, easy to install, and economical. The embodiments can be made from a single sheet metal blank, without any welding.

Many houses are still built with the time-honored method of toe-nailing the rafter or roof truss to the top plate of the wall. This weak method drives a nail at a steep angle through a thin edge of the rafter into the top plate. Any uplifting force splits the rafter or pulls the nail out.

Exact measurements are usually performed to get the rafters in the correct location, but toe-nailing or striking the rafter at a steep angle shifts the rafter even when striking it from nailing on the opposite side. Installing this invention between rafters or trusses cuts measuring time drastically and eliminates toe-nailing so the rafters or trusses are exactly on-center.

A further object is that this invention can be used on various size sheathing, rafters, roof trusses, studs, wood or metal I-beams, TJI, and glue-lams, all made from wood or metal. There may be insurance discounts for homeowners who have this invention installed on their houses.

Traditional toe-nailing of the rafter is at the bird's-mouth, a notch cut into the rafter where it rests on the top plate. By cutting out material from the rafter, a bird's-mouth weakens the rafter. Toe-nailing only two nails from either side grasps only a small edge of the rafter, and the nail only extends into the top 2x of the top plate. This invention can make cutting deep birds-mouths into the rafter unnecessary.

This invention is adjustable, using a double-bend, in order to fit the variable heel height at the rafter, caused by different roof slopes.

Tests were done by the Colorado School of Mines on my co-pending hurricane clip, application Ser. No. 09/191,852. The tests showed that the rafter split lengthwise, due to uplifting force, before the clip failed. Rafter tabs and gussets on this invention may prevent the rafter from splitting, and will hold it together even if the rafter splits lengthwise at the connector.

This invention strengthens the rafter to top plate connection by vastly increasing the spacing and amount of nails in the thickest part or "meat" of the rafter. This clip also strengthens the bird's mouth by wrapping on either side of the rafter and keeping it from splitting along the long measure. By placing members and fasteners on both sides of the front face and into the rafter, strength is increased tremendously.

Another advantage is with two adjacent rafters tied together and to the top plate, it tremendously increases resistance to thrusts. This makes the roof much stronger and able to resist more weight such as thick snow, ice, or volcanic ash, and heavy roofing material such as tile, insulated roofing, solar collectors, and satellite dishes.

This invention takes the place of a left and right prior art hurricane clip, thus cost and installation time is substantially reduced. Installation can be accomplished with a hammer, power nailer, or powered screw gun.

Since this invention fills the space between rafters, wood blocking does not have to be cut to fill the space, thus saving trees and labor. The invention can be made from recycled steel. By forming a box-like section, torsional twisting is significantly reduced over prior art hurricane clips. Cross-grain splitting, where the sheathing pulls away from nails driven on its edge, is avoided with this invention and its large surface area on the wall sheathing, and on the roof sheathing.

The left and right rafter tabs, that are installed on opposite sides of the rafter have offset nail holes. Nails driven into the rafter will be offset from each other lessening wood splitting and vastly increasing holding power. Fasteners into the top plate are on adjacent sides of the top plate. This holds the top plate together and puts nails in shear. To move up, down, in, out, or side to side, some nails must be sheared.

By drilling a hole in the roof, and adding a simple roof plate, bolt, and nuts, the roofing material and roof sheathing can be held down to the roof rafter. This invention can hold down the roofing material and roof sheathing to the rafter or roof truss, providing great rigidity to the entire house. This makes the house significantly more resistant to uplift from strong winds, and lateral movements from earth tremors.

These and other objectives of the invention are achieved by simple and economical connectors that allow a builder to quickly and easily secure the weakest parts of a building against wildfires, earth tremors, and high winds.

Advantages of each will be discussed in the description. Further objects and advantages of my invention will become apparent from a consideration of the drawings and ensuing description.

REFERENCE NUMBERS FOR DRAWINGS

| Reference Numbers for Drawings | |
|---|---|
| 1. | Adjustable plate |
| 2. | Left sheathing tab |
| 3. | Right sheathing tab |
| 4. | Bolt hole |
| 5. | Gusset bend |
| 6. | Left gusset |
| 7. | Right gusset |
| 8. | Nail hole |
| 9. | Rafter bend |
| 10. | Left rafter web |
| 11. | Right rafter web |
| 12. | Transition bend |
| 13. | Right spacer web |
| 14. | Left spacer web |
| 15. | Plate bend |
| 16. | Left plate web |
| 17. | Right plate web |
| 18. | Face plate |
| 19. | Lower face |
| 20. | Nail holes |
| 21. | Ribs |
| 22. | Nail holes |
| 23. | Fire block |
| 24. | Sheathing bend |
| 25. | Nail holes |
| 26. | Roof plate |
| 27. | Bolt holes |
| 28. | Bolt |
| 29. | Fastener |
| 30. | Nut |
| 31. | Blocking plate |
| T. | Top plate |
| R. | Rafters |
| S. | Roof sheathing |
| W. | Wall sheathing |
| D. | Wall stud |

DESCRIPTION OF DRAWINGS

Figure 1:
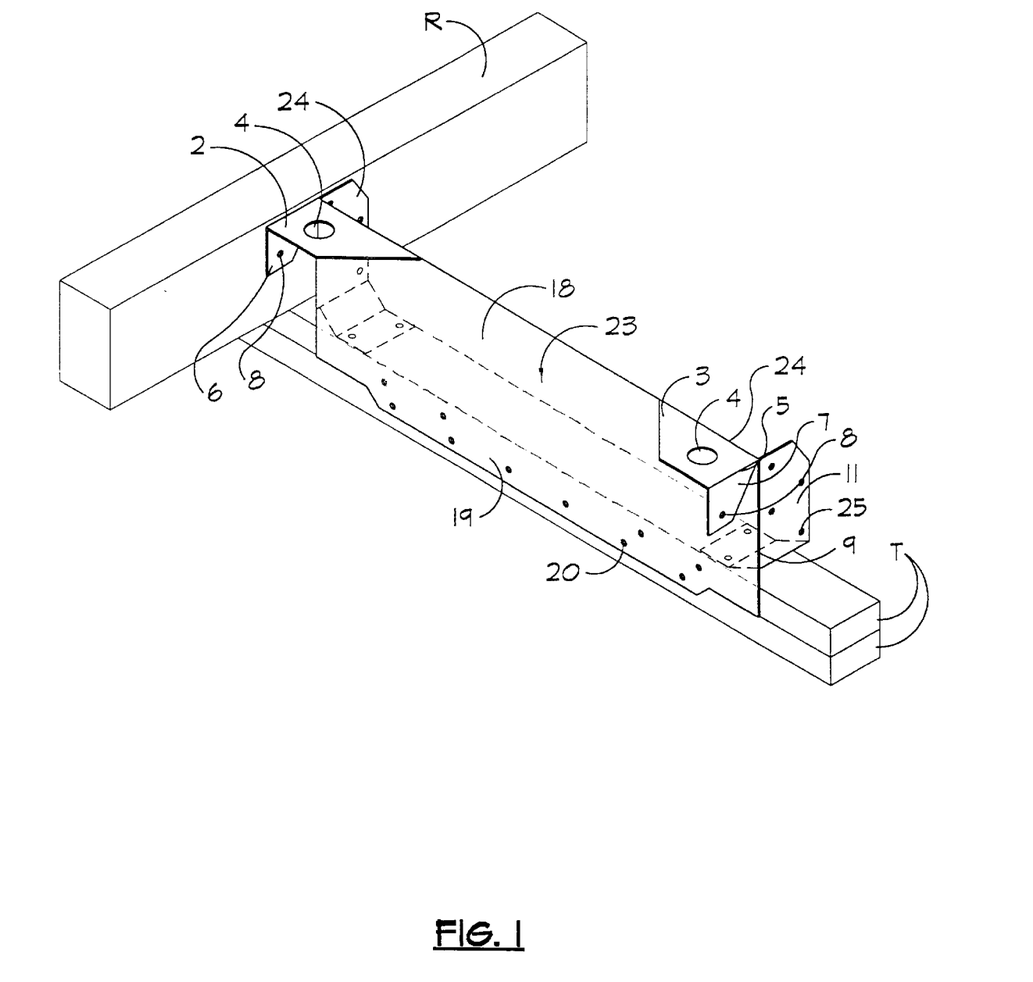
FIG. 1 is a perspective view of a fire block.

Refer now to FIG. 1 which shows a perspective view of a fire block 23 installed on a rafter R and top plate T. The face plate 18 covers the open area between adjacent rafters, the top plate, and the roof. On the left side of the fire block 23, the left sheathing tab 2 is bent forward from the face plate 18 by the sheathing bend 24. The sheathing tab 2 is bent generally parallel to the rafter R and roof, and is about even with the top of the rafter R.

A right angle bend, on the sheathing tab 2, adjacent to the sheathing bend 24 on the face plate 18, forms the gusset bend 5. This bend forms a left gusset 6 with nail holes 8. The sheathing bend 24 and adjacent gusset bend 5 form the left gusset 6 perpendicular to the face plate 18, and planer to the left rafter web 10, hidden behind the face plate 18 in this view. The left gusset 6 is shown attached to the wide flat part of the rafter R with fasteners through the nail holes 8.

The lower part of the face plate 18 has a lower face 19 that has nail holes 20. The lower face 19 is positioned alongside the top and bottom plates of the top plate T, and fasteners are attached through the nail holes 20 into the vertical sides of both plates of the top plate T.

On the right front top of the face plate 18, the sheathing bend 24 forms the right sheathing tab with a bolt hole 4. Adjacent to the sheathing bend 24, the gusset bend 5 forms the right gusset 7 with nail holes 8.

The right sheathing tab 3 and left sheathing tab 2 are generally parallel. The right gusset 7 and left gusset 6 are generally perpendicular to tie into the wide part of adjacent rafters. The right rafter is missing from this view for clarity of the invention.

On the right rear middle of the face plate 18, a right angled rafter bend 9 forms a right rafter web 11. The right rafter web 11 has nail holes 25 for attachment to the same side of the rafter R as the right gusset 7, but on opposite sides of the face plate 18. The right side of the fire block 23 shows how there are mounting points to the rafter R on the front of the fire block 23 and on the rear. This provides tremendous strength and resistance to trusting and lateral loads. Other parts on the fire block 23 are hidden from view and will be discussed in other figures.

The left and right sides of the fire block 23 are basically mirror images of each other, so what is said of the left side also applies to the right side. FIGS. 2–6 show the right side of the fire block, but the same can be said for the left side.

The fire block 23 is installed on a building by placing the lower face 19 against the vertical sides of a top plate T and raising the face plate 18 until the top of the face plate 18 and sheathing tabs 2 and 3 are even with the top of the first rafter or roof truss R. Then fasteners can be used to fasten the lower plate 19 to the sides of the top plate T, the gusset 6 and rafter web 10 to the rafter R, and the plate web 16 to the top of the top plate T.

If the other rafters R were already installed, then the right side gusset 7, rafter web 11, and plate web 17 can be fastened. If the rafter hasn't been installed, it can be placed against the right side gusset 7, rafter web 11, and side of the face plate 18 so it will be exactly spaced at 24 inches-on-center. With the right sheathing tab 3 against the top of the rafter R, fasteners can be driven into nail holes 8, 25, and 22.

Figure 2:
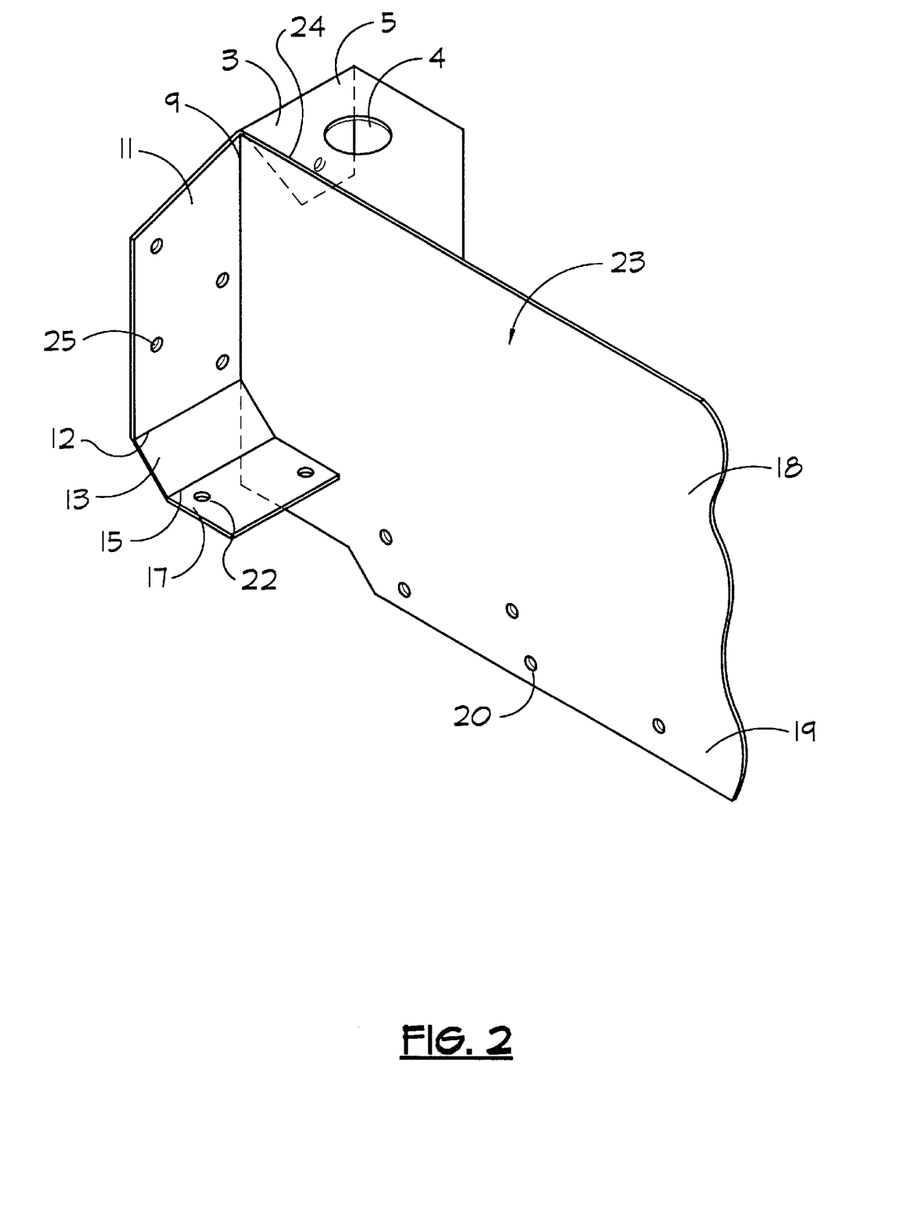
FIG. 2 is a perspective view of the right rear of a fire block.

Refer now to FIG. 2 which shows the right rear of a fire block 23. The rear was not seen in FIG. 1. It can be seen here more clearly how the rafter bend 9 forms the right rafter web 11 to the rear of the face plate 18. At the bottom of the right rafter web 11, a transition bend 12 forms a spacer web 13, with a plate bend 15 opposite the transitional bend 12. The plate bend 15 forms a right plate web 17 with nail holes 22.

The double bends on the spacer web 13, at the transitional bend 12 and plate bend 15 allow the right plate web 17 to deflect, so the top of the face plate 18 can be flush with the top of the rafter R. This allows the fire block 23 to completely block the opening between the rafters, top plate, and top of the rafter, even with rafters on various slope pitches. With different slop roofs, the heel height, the distance between the top plate T and top of the rafter R will change.

With the plate webs 16 and 17 able to be deflected, they can still be parallel to the top of the top plate, in order to have secure attachment to the top plate of the top plate T, even when the heel height changes at the rafter R and top plate T. With the double bends 12 and 15 on the spacer webs 13 and 14, the spacer webs can move from generally upright to generally level, while keeping the plate webs 16 and 17 parallel to the top of the top plate T.

Rafters and roof trusses are usually set on a building at 24 inches-on-center. Two feet between the center points of the rafter. Distance between the vertical sides of adjacent rafters is usually 22½ inches, the approximate width of the face plate 18. After the first rafter is set in the correct position, the fire block 23 can be installed to it. The next rafter can be fastened to the opposite end of the fire block 23. This spaces the rafters the standard distance from each other, saving time.

The sides of the face plate 18 will be snug against the adjacent rafters R, along with the rafter webs 10 and 11, and gussets 6 and 7. By placing the top of the face plate level with the top of the adjacent rafters R, the lower face 19 can be fastened to the side of the wall sheathing W and/or top plate T. With the correct height of the face plate 18 in the opening between the rafters R, fasteners can attach the rafter webs 10 and 11, and gussets to the rafters R. Fasteners can attach the plate webs 16 and 17 to the top of the top plate.

Figure 3:
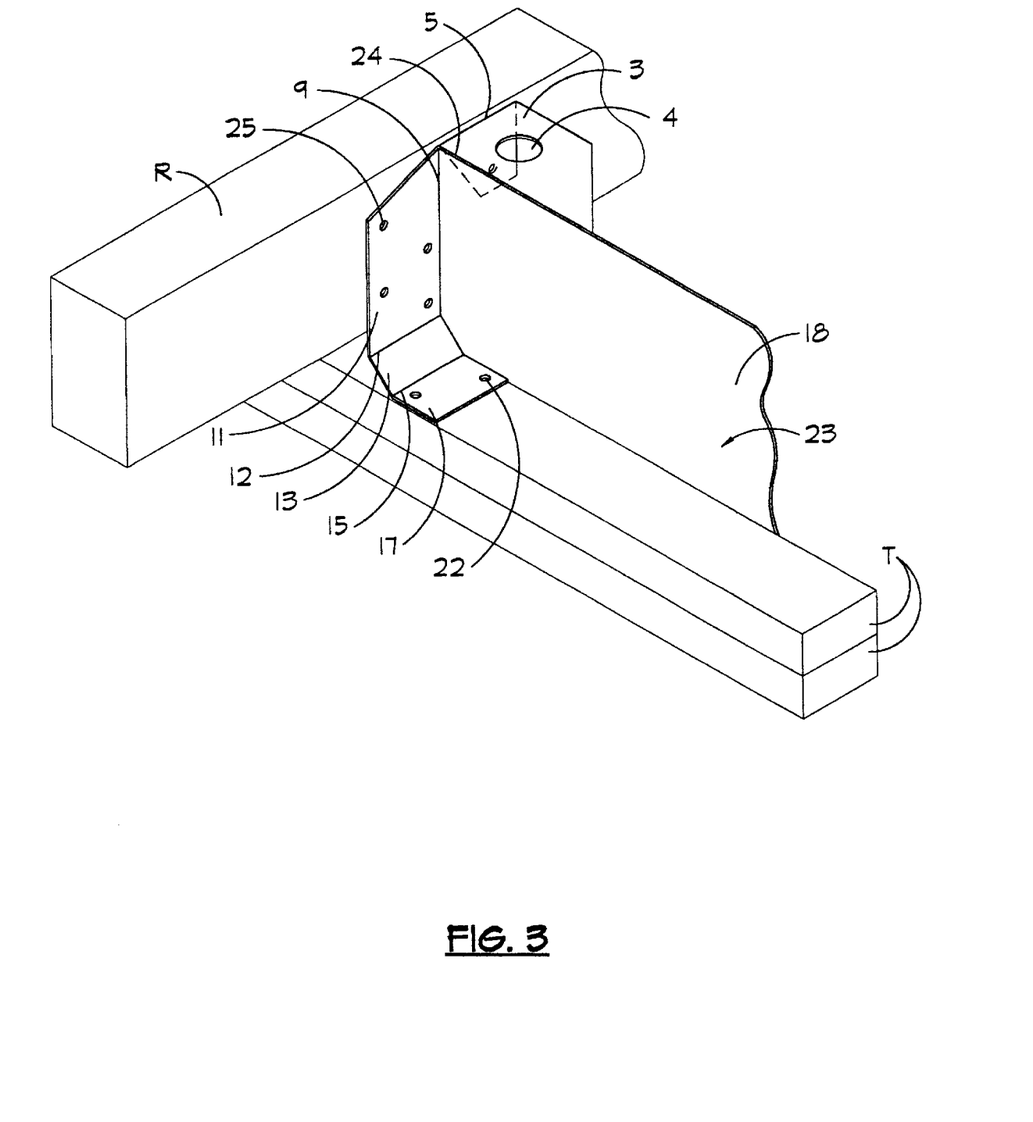
FIG. 3 is a perspective view of the right rear of a fire block mounted on a rafter and top plate.

Refer now to FIG. 3 which shows the rear right side of a fire block 23 installed to a rafter R and top plate T. The roof pitch here is relatively steep so the distance between the top of the top plate T and the top of the roof rafter R has changed. The spacer web 13 is more vertical in this view, but the top of the face plate 18 and the sheathing tab 3 are level with the top of the rafter R, and the plate web 17 is parallel to, and attached to the top of the top plate T.

The distance between the top of the top plate T and top of the rafter R is often referred to as the heel height. Although the distance between rafters is usually a standard 24 inches-on-center, the heel height can change according to the pitch of the roof, and deepness of the cut of the birds-mouth on a rafter. For roof trusses, the heel height can change according to roof pitch and how much of the bottom chord sits on the top plate T.

Wildfires outside the house can quickly gain entry to the inside roof by ventilation openings between the rafters, top plate, and roof The ventilation openings can be in the soffit, frieze boards, or blocking. Some engineers think that attic spaces do not have to be vented. The vents cause a chimney effect, drawing the heat and flames of a wildfire into the attic, where it can not be put out by outside measures. Even if the outside roof material is fire proof, the fire is already inside the building, coming through the outside vents.

The fire block 23 uses the double bends on the spacer webs 13 and 14 to space the top of the face plate 18 tightly against the roof sheathing, which is level with the top of the rafter R. The lower face 19 is tightly against the vertical edges of the top plate T, and the rafter webs 10 and 11 are tightly against the rafters R. This completely blocks off any opening between the rafters, top plate, and roof sheathing. This prevents a chimney-effect from pulling outside flames into the attic. The strong connection between the rafter, top plate, and roof helps prevent uplift during strong winds, and also prevents lateral shaking during seismic events.

Figure 4:
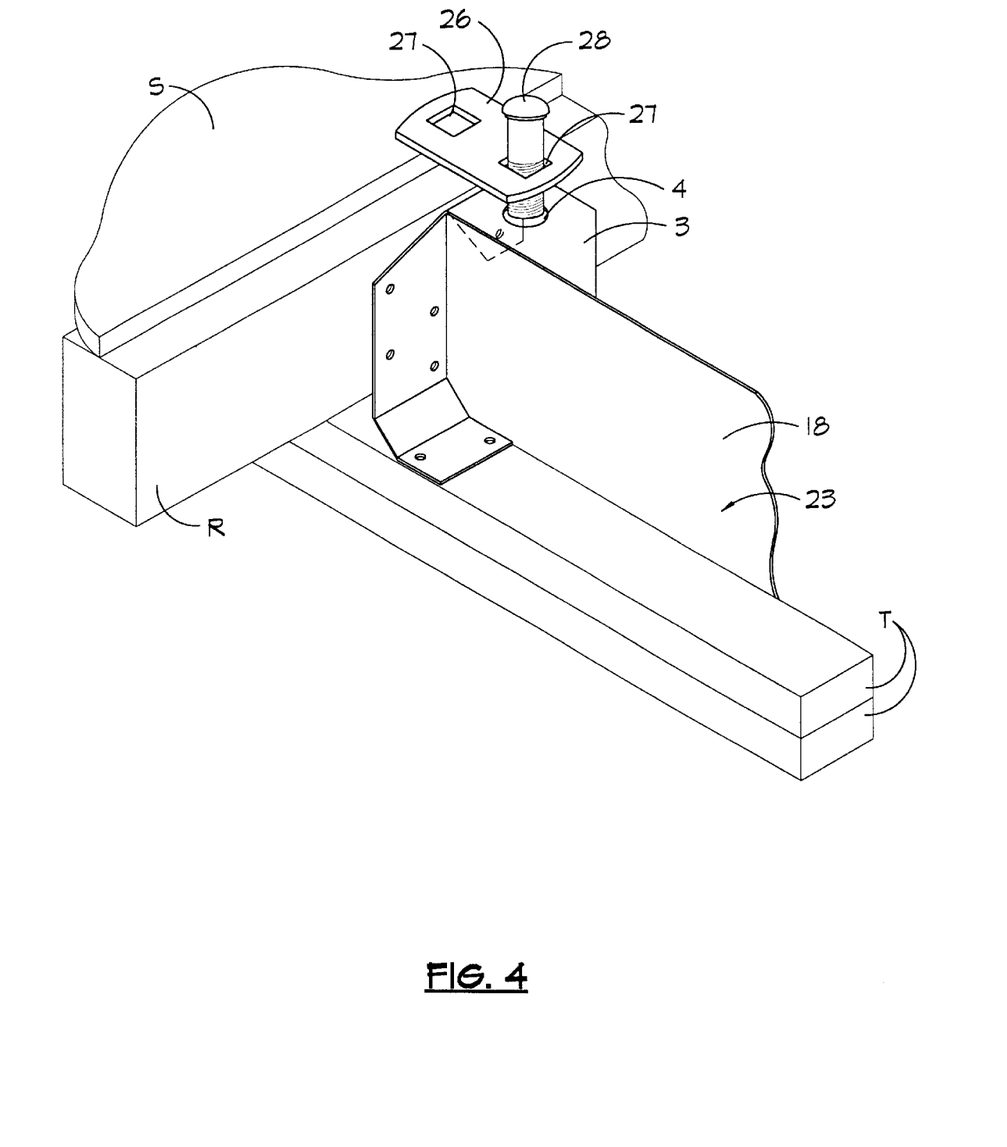
FIG. 4 is a perspective view of the right rear of a fire block mounted on a rafter, top plate, and roof sheathing.

Refer now to FIG. 4 which shows the right rear of a fire block 23 attached to a top plate, rafter, and roof. After the fire block 23 is attached to the rafter R and top plate T, the roof can be applied to the house. Roof sheathing S is normally fastened to the tops of the rafters R, then roofing material such as felt, tar paper, and shingles are applied. Roof plates 26 can be used to affix the roof securely to the fire block 23.

Bent from the face plate 18, along the sheathing bend 24, the right sheathing tab 3 can be joined to the roof sheathing S and roofing material M. for added strength against uplift and lateral movement. A hole is drilled up through the bolt holes 4, on the sheathing tabs 2 and 3, into the roof. The holes are in front of the fire block 23 and are in front of the outside wall. Therefore there would be no leakage into the house. But the holes should not leak because a wide roof plate 26 will be placed over the drilled holes, and bolts 28 can be installed through the square bolt holes 27 of the roof plate 26, into the drilled holes, and through the bolt holes 4 on the sheathing tabs 2 and 3. A nut 30 can be tightened from below onto the bolt 28.

FIG. 4 shows how roof sheathing S is applied to the rafter R, so the edge of a sheet of sheathing S is along the midpoint of the rafter R. An adjacent sheet of roof sheathing S can but near the previous sheet and still have nailing onto the rafter R. The roof plate 26 is shown holding down two sheets of sheathing S that butt together on the rafter R. Only a thin edge of roof sheathing S is nailed to the relatively thin edge of the rafter R. The roof plate 26 keeps both edges of roof sheathing S from lifting off the rafter R due to strong winds. It also keeps the edges from riding over, or detaching from each other during lateral movements of the roof. This forms the roof sheathing S into a shear-wall.

Figure 5:
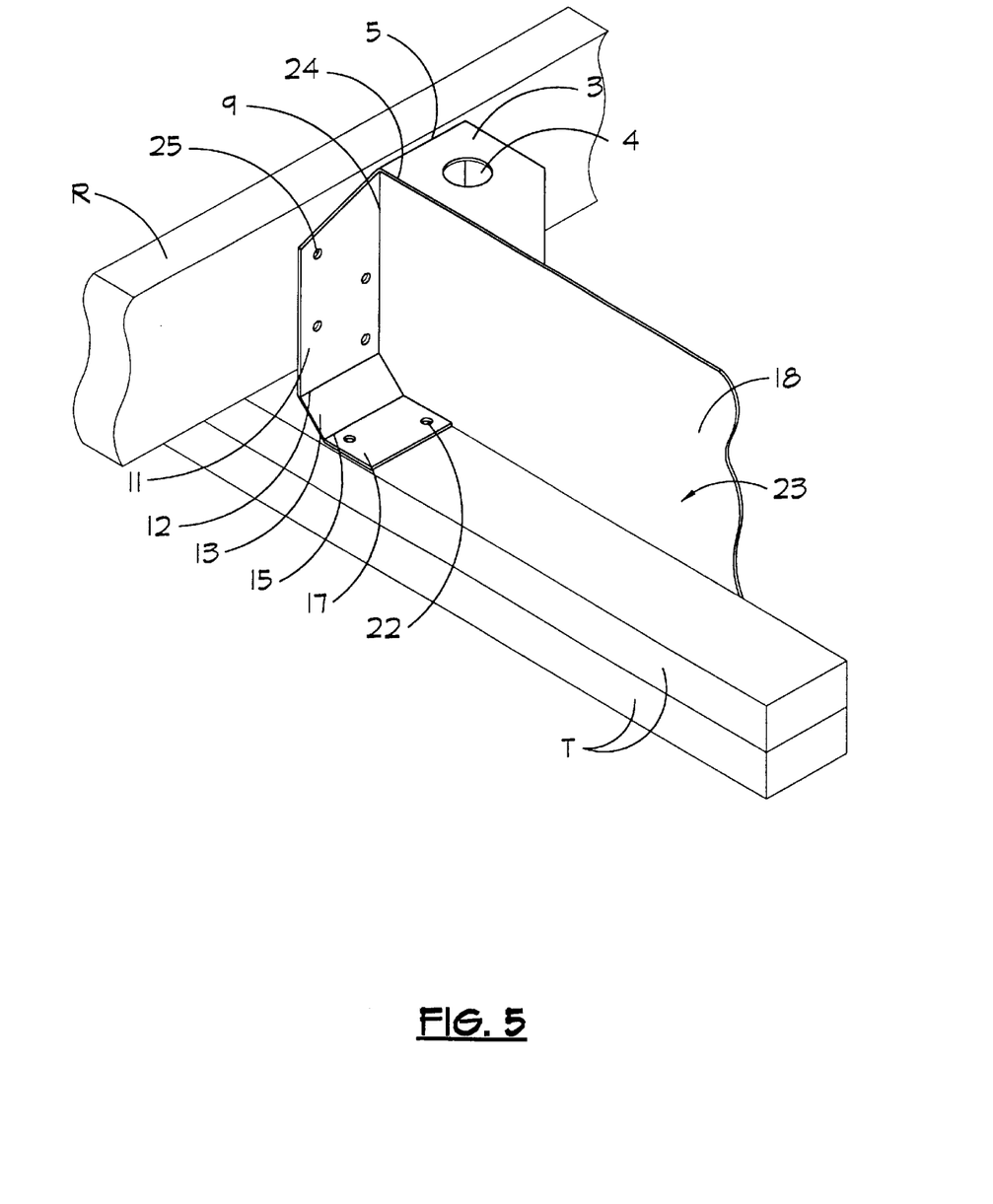
FIG. 5 is a perspective view of the right rear of a fire block mounted on a shallow-pitch roof.

Refer now to FIG. 5 which shows the fire block installed on a shallow-pitch roof The difference between this view and FIG. 3, is the shallower slope of the roof. The heel distance between the top of the top plate T and the top of the rafter R is shortened in this view. The heel height is decreased, but the double bends 12 and 15, on the spacer web 13, allow the spacer web 13 to flatten toward the top plate T. The plate web 17 is parallel to and attached to the horizontal top of the top plate T.

The fire block 23 uses the double bends on the spacer webs 13 and 14 to space the top of the face plate 18 tightly against the roof sheathing, which is level with the top of the rafter R. The lower face 19 is tightly against the vertical edges of the top plate T, and the rafter webs 10 and 11 are tightly against the rafters R. This completely blocks off any opening between the rafters, top plate, and roof sheathing. This prevents a chimney-effect from pulling outside flames into the attic. The strong connection between the rafter, top plate, and roof helps prevent uplift during strong winds, and also prevents lateral shaking during seismic events.

Figure 6:
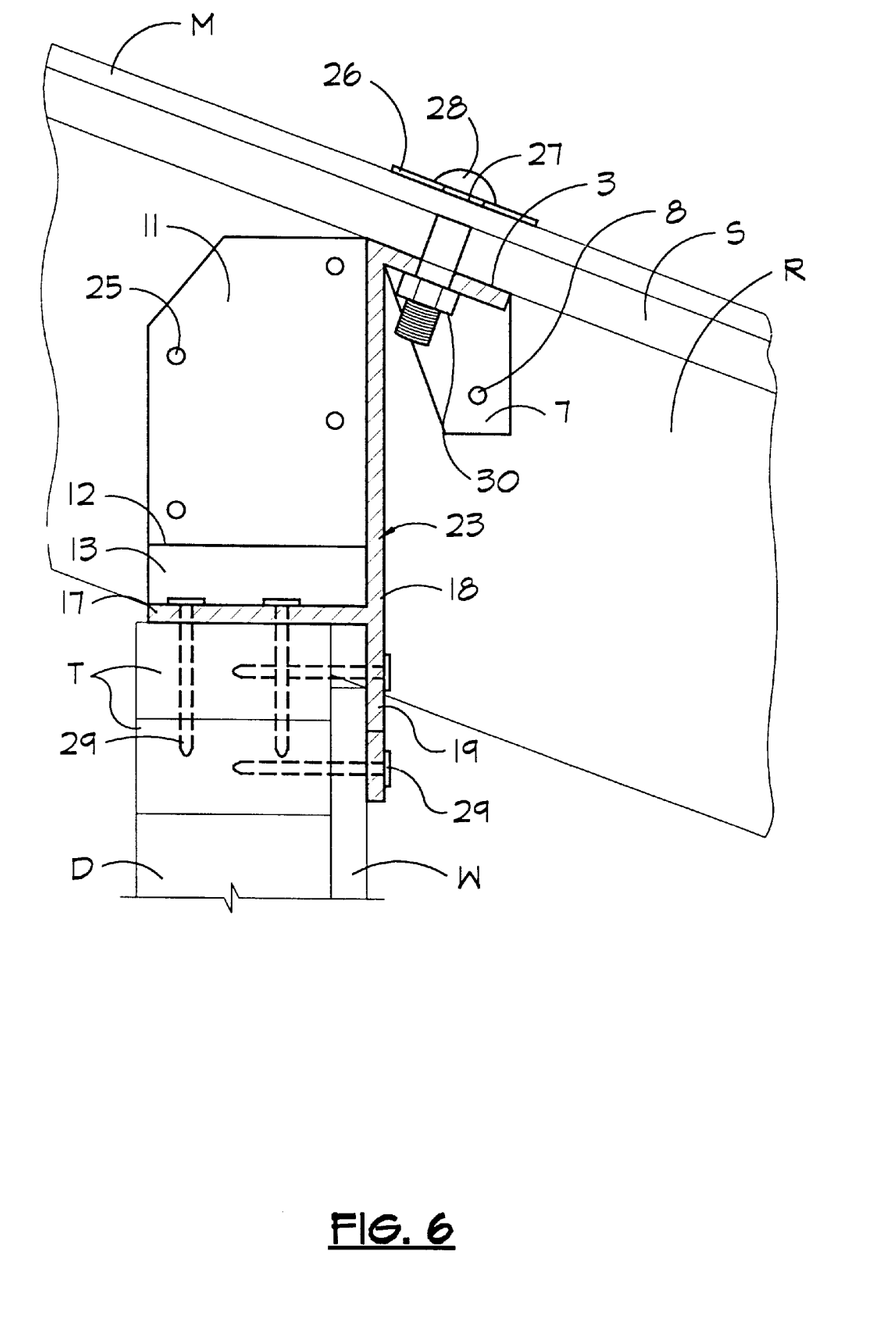
FIG. 6 is a cross-sectional view through the face plate, top plate, and roof sheathing.

Refer now to FIG. 6 which shows a cross-sectional view through the face plate 18 of the fire block 23, and the top plate T and roof sheathing S, looking to the right. The lower face 19, on the bottom of the fire block 23, is attached to the outside wall sheathing W and underlying top plate T. The wall sheathing W was attached to the wall before the rafters R were installed.

The right plate web 17 is attached to the top of the top plate T by vertical fasteners 29. The lower face 19 is attached to the vertical wall sheathing W and sides of both plates of the top plate T by horizontal fasteners 29. This perpendicular nailing ensures a secure connection between the fire block 23 and the wall. The wall sheathing W is attached to the wall stud D, which is also attached to the top plate T, and sill plate next to the foundation. The forces acting on the top of the wall can now be directed to the foundation. Forces acting on the roof would have to shear some of the nails since they are perpendicular to each other.

Attached to the right plate web 17 are the plate bend 15, right spacer web 13, transition bend 12, and right rafter web 11. The right rafter web 11 is attached to the wide side of a rafter R, by fasteners through nail holes 25. The rafter R has a moderate pitch, like the rafter in FIG. 3, so the spacer web 13 is at a moderate angle.

The face plate 18 is cut through in this view, but it can be seen how the face plate 18 completely closes off the space between the roof sheathing S and the top plate T, and has attachment to both. There are no gaps at the sides because the rafter tabs 10 and 11 are tight against the adjacent rafters R, along with both side edges of the face plate 18. This complete enclosure of the empty space between the rafter R, top plate T, and roof sheathing S insurers that there will be no chimney-effect, or draft-effect, drawing heat and flames into a house. The complete enclosure also provides stiffness against hurricanes and earthquakes.

On the right side of the face plate 18, on the outside part of the house, the right sheathing tab 3 is bent to the front of the face plate 18. The sheathing tab 3 is generally parallel to the roof sheathing S. The gusset bend 5 forms the right gusset 7 against the same flat side of the rafter R, as the right rafter web 11. Fasteners through nail holes 8 attach the right gusset 7 to the rafter R. This puts mounting webs 11 and 7 facing the rafter R on the front and rear of the face plate 18.

By having the right rafter web 11 and right gusset 7 attached to the front and rear of the face plate 18, and the face plate's strong connection to the top plate T, (the perpendicular nailing mentioned earlier) the rafter R is prevented from moving. Thrusting, the force of gravity pulling the roof down, and pushing the wall outward is prevented by the strong connection between the rafter R and top plate T, and wall sheathing W. Uplift of the rafter R is prevented because of multiple connections at the right rafter web 11 and right gusset 7 onto the rafter R, and the wide connection of the lower face 19 onto the top plate T.

The rafter R is prevented from twisting left or right because the edge of the face plate 18 is flush against the rafter R, and the right rafter web 11 and right gusset 7 are connected to the rafter R. Lateral movement, when the rafter is forced left or right of the top plate T, is prevented by the a combination of connections, as the edges of the face plate 18 are against the rafters R, and the rafter webs 10 and 11, and gussets 6 and 7, on the front and rear of the face plate 18, are secured to the rafter R. The positive connection of the lower face 19 to the top plate T, and the connection of the plate webs 16 and 17, help prevent twisting and lateral movements.

By having a secure connection to the roof sheathing S and roofing material M, strength is increased tremendously. Besides the stated resistance to twisting, thrusting, uplift, and lateral forces that the basic fire block 23 provides, adding the roof sheathing connection doubles or triples the resistance.

Figure 7:
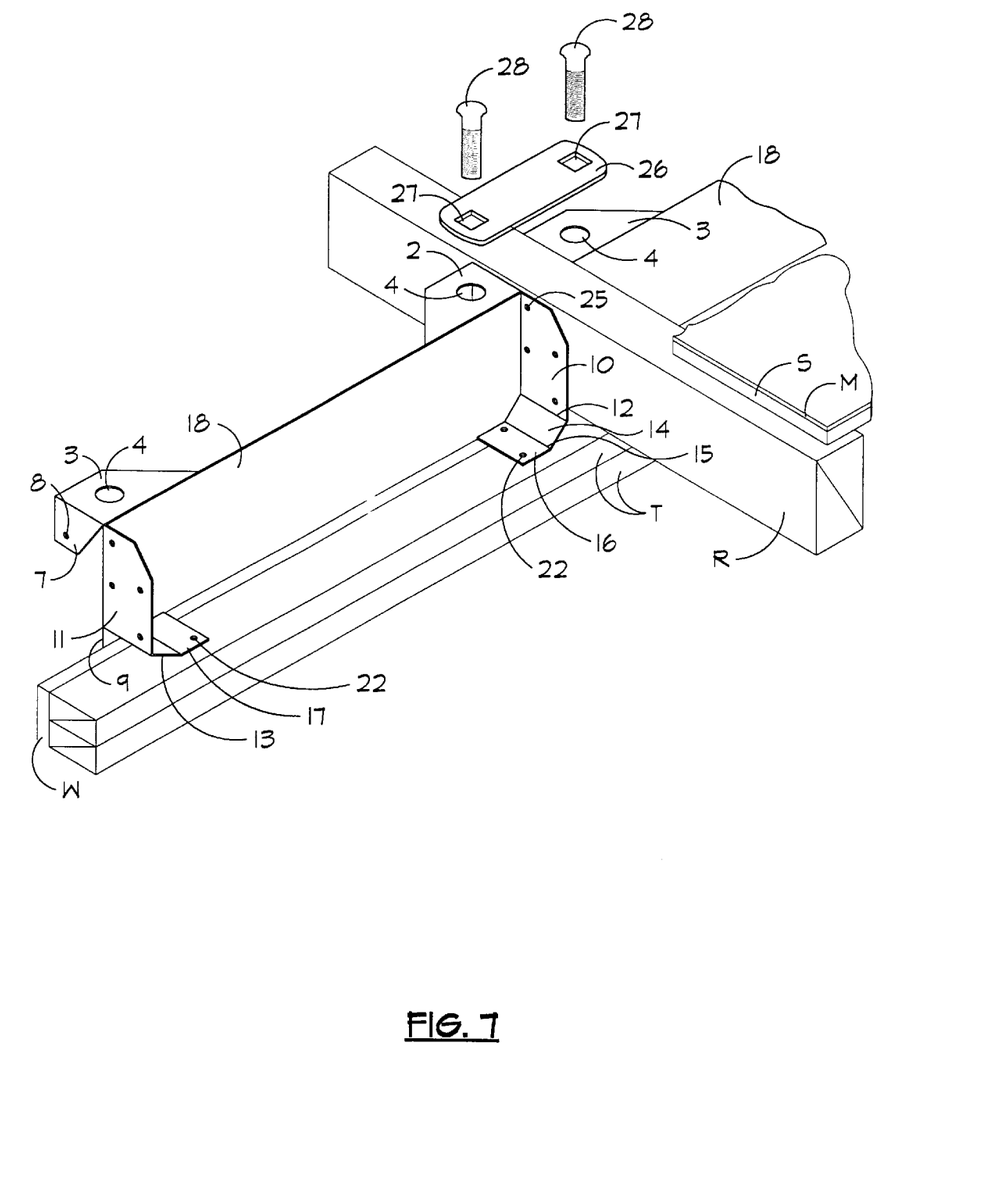
FIG. 7 is a perspective rear view of two fire blocks mounted on a wall and roof

Refer now to FIG. 7 which shows a perspective view of the rear of two fire blocks 23 attached to a building. The fire blocks 23 have been attached to the top plate T and rafter R as described earlier. The left rafter is missing from this view to show the invention more clearly. A hole has been drilled up from the bolt holes 4 on the sheathing tabs 2 and 3 and through the roof sheathing S and roofing material M. A roof plate 26 is about to be attached to the roof by means of bolts 28 through bolt holes 27.

It can be seen how the bolts 28 will tie the roofing material M and the roof sheathing S to fire blocks 23 on opposite sides of the rafter R. Now, both the left and right fire blocks 23 are tied together by the bolts 28, roof plate 26, and roof sheathing S. This provides a continuous horizontal load path for any forces acting on the roof The solid connection between the roof sheathing S, rafter R, top plate T, and wall sheathing W provide a continuous vertical load path for any forces acting on the roof The roof can also absorb and deflect many forces acting on the roof and walls. Flames outside the building can not enter the attic area through the previously open space between the rafters, top plate, and roof.

It can be seen how the face plate 18 forms a brace between rafters, top plate and roof. By forming a sturdy closed-box between adjacent rafters R, top and sides of the top plate T, and roof sheathing S, outside flames can not get in. By forming a strong, closed box-shape between the rafters, top plate, and roof sheathing damage from hurricanes, tornados, and earthquakes are lessened.

FIG. 7 shows that the adjacent rafters or trusses are now tied securely together. The rafters are also tied securely to the top and side of the top plate, with perpendicular nailing. The roof sheathing is also bolted to the rafters and to the top plate. Uplifting forces from a hurricane would have a hard time lifting the edge of the roof sheathing as the roof plate 26 forms a large surface area, like a washer, on top of the roof sheathing. Strong winds would find it difficult to lift the rafter from the top plate. If this were the gable or last rafter, the roof plate 26 could be at an angle, so it doesn't hang over the roof, or a washer could be used.

Studies have shown that when an earthquake strikes, there is an uplifting force and then ground shaking. Since the walls and roof are now tied together so securely, the roof can act like a shear wall, absorbing and transmitting forces to the strongly attached walls which will also act as shear walls. Since the house can move as a solid unit there will be less damage to the house and its contents.

During hurricanes or strong winds parts of the roof can have a twisting or torque force applied to the rafter. This force can rip out the toe nailed connections and twist prior art connectors. This invention prevents twisting of the rafter R because of the positive connection to adjacent rafters R, and to the top plate T, roof sheathing S, and wall sheathing W. Adjacent rafters R are connected together with this invention and positively connected to the top plate A and roof sheathing S.

The face plate 18 of the fire block 18 is similar to blocking, preventing twisting or movement of the rafters while saving wood, carpentry labor, time, and money. Prior blocking was usually cut by a carpenter, but there may only be one carpenter for each house development, so they are usually left out. Prior blocking was usually just toe-nailed in between rafters. This invention takes the place of blocking while providing a strong connection between the rafters R, top plate T, wall sheathing W, and roof sheathing S.

Figure 8:
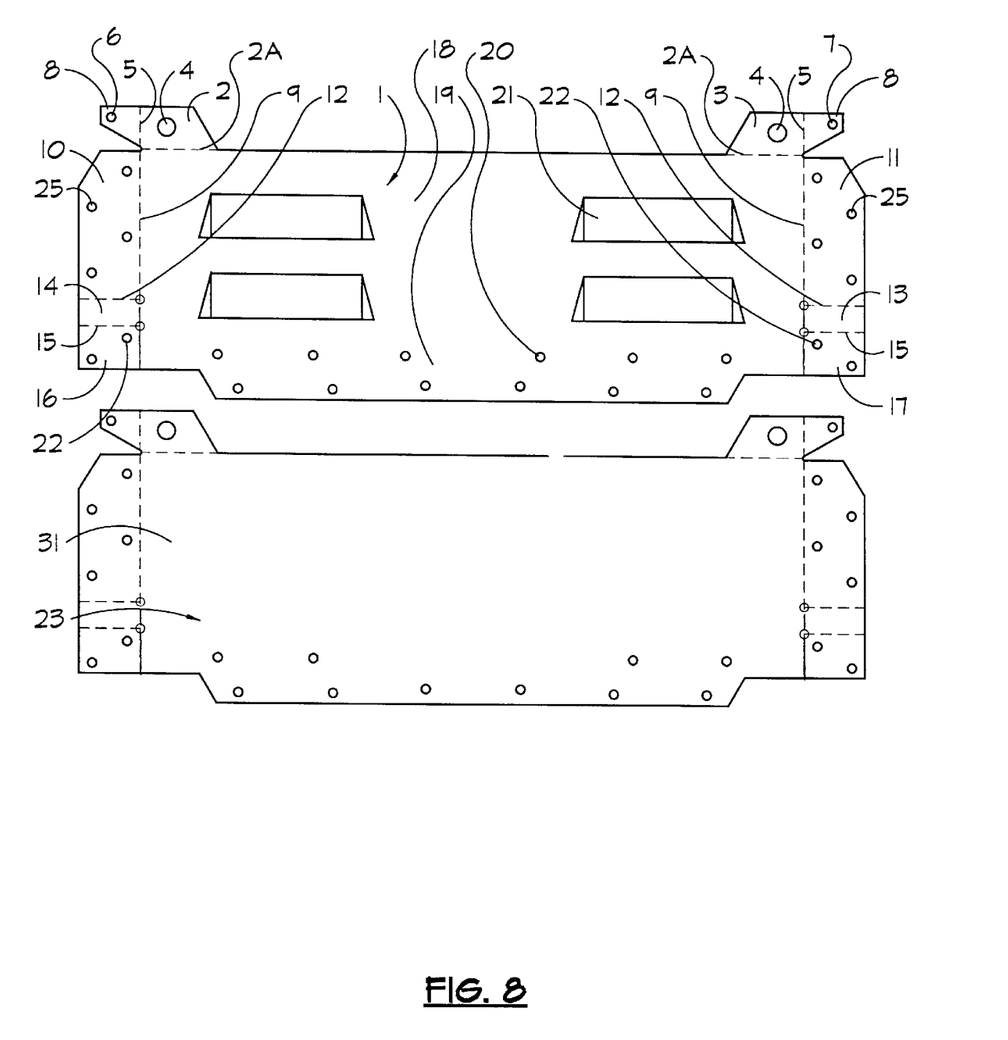
FIG. 8 is a flat pattern layout for a fire block and adjustable plate.

Refer now to FIG. 8 which shows a flat pattern layout of an adjustable plate 1 and fire block 23. The difference between the adjustable plate 1 and fire block 23 is that the fire block has a solid face plate 18 and the adjustable plate 1 has ribs 21. The ribs 21 can be closed for strengthening ribs or open for ventilation ribs. The same tool and die can make both the fire block 23 and the adjustable plate 1. It can be seen that there is little waste of material, because each tie nests with the next one during manufacture.

The flat pattern layout shows the adjustable plate 1 and fire block 23 prior to bending. Bending along the rafter bends 9, bends the rafter webs 10 and 11 back and perpendicular to the face plate 18. This allows the rafter webs 10 and 11 to be attached to adjacent rafters R. The plate webs 16 and 17 are generally parallel and planer to each other after the acute transition bends 12 and plate bends 15 are completed.

The sheathing bend 24 allows the sheathing tabs 2 and 3 to be bent forward, and the gusset bends 5 allow the gussets 6 and 7 to be parallel and planer to the rafter webs 10 and 11. No matter what the roof pitch, the sheathing tabs 2 and 3 can be bent tight against the roof sheathing S, while the gussets 6 and 7 still remain parallel and planer to the rafter webs 10 and 11, and the rafter R.

Dramatic photos and videos of roofs being lifted off the wall during a hurricane shows the weak connection on old and new houses. Much of the debris shown on these videos are roof sheathing and roof rafters. This invention helps prevent uplift and detaching of the rafters and roof sheathing by tying the roof sheathing S, rafter R, top plate T, and outside sheathing W together with a permanent metal connection, that is unaffected by fire, rain, sun, or insects.

Prior construction methods of toe nailing along the bottom of the rafter only caught a thin edge of the rafter. It did not matter if the rafter was a 2×4, 2×6, or 2×8, only an inch or less of corner was held to the top plate. These nails are in the same general direction of up lift. When uplift was applied in testing at the Colorado School of Mines in Colorado, the rafter split or the nails pulled out under low loads. No prior art was found that ties adjacent rafters R together, ties them to the horizontal and vertical face of the top plate T, and ties into the outside sheathing W and roof sheathing S.

FIG. 6 shows how the rafter R is now tied to the top plate T on the horizontal face by plate webs 16–17, and along the vertical face of the top plate T by the lower face 19. Uplift of the rafter R is now prevented by nails or screws that would have to be sheared the entire length of the top plate T between rafters, along the lower face 19. Nails or screws would also have to be sheared the entire width of the rafter R, along the rafter webs 10 and 11, and along the gussets 6 and 7. Also, and nails or screws that would have to be pulled out of the width of the top plate T.

FIG. 7 shows how the fire block 23 prevents lateral movement by forming a strong box-section between adjoining rafters R, roof sheathing S, and top plate T, with fasteners on each structural member. FIG. 7 also shows how the top of the wall is braced by the strong connection to the rafter or roof truss from moving in or out due to thrusting, or wind pressure trying to push the wall in or suck the wall out.

After Hurricane Andrew in Florida, it was found that many of the staples used to hold down the roof sheathing had rusted away. Investigators also found that many of the roof sheathing sheets on the ground showed that the nails had gone through the sheathing, but had missed the underlying rafter or only caught a thin edge. Some sheets had no evidence of ever being nailed down to the rafter. FEMA publication FIA-22 on Hurricane Andrew.

Once the rafters R are anchored to the top plate T, the roof sheathing S can be attached to the rafters R, and later, roof plates 26 can be bolted to the sheathing tabs 2–3. This ties down the most critical part of the roof sheathing, right above where the interior part of the house starts. This also prevents flames from getting inside the house. The fire block 23 nests during manufacture, which saves material and money. The roof plate 26 can be simple flat metal plate or one could use the roof plate from my previous applications mentioned in the prior art.

CONCLUSIONS, RAMIFICATIONS, AND SCOPE OF INVENTION

Thus the reader will see will see that the fire block of the invention provides a practical, strong, rudimentary connector that can be quickly installed by standard construction methods yet saves time and resources.

While my above description contains many specificities, these should not be construed as limitations on the scope of the invention, but rather as an exemplification of one preferred embodiment thereof. Many other variations are possible. For example there can be minor variations in size, and materials. For example, the ties can have more rounded corners, squarer corners, different nail holes, or be thicker or thinner, wider or, longer. The ties can be made for rafters 16 inches-on-center or 24 inches-on-center, or other odd shapes, such as metric.

The fire block can be attached to the outside sheathing and vertical face of the top plate. The fire block can also be attached to the inside or rear face of the top plate. The tie can have different dimensions to fit the particular plans of the engineer and architect. In areas that have high winds or earthquakes, the ties could be thicker, wider, or have more nail holes. The tie can have a round shape on the face in order to fit on curved walls, or the front face could have a drip edge formed near the bottom.

The roof plates can hold down boards instead of roof sheathing; they can also hold down insulated sheets, metal sheets, plastic sheets, roof tiles, fire-proof, and standard roofing material. The ties can have a variety of shapes stamped in the roof plates to hold down a variety of objects against the roof sheathing such as brackets for solar heaters or solar collectors. The ties can be made of metal by stamping, forging, or casting. The ties can be made of plastic, by molding or casting. The ties can be made of recycled materials. The ties can be made with bright colors, so a builder or inspector knows they are in position. They can be of different thicknesses, for different strength on different applications.

When a roof plate is attached to the sheathing tab with bolts, it adds tremendous strength by holding down the roof sheathing and adding the stiffness of the roof sheathing to the invention. But some areas of the country may only need the fire-blocking ability of the invention. In that case the sheathing tabs and gussets could be eliminated from the invention. The invention's rafter webs would still hold the invention to the rafter and the plate webs would still hold to the top of the top plate. The lower face would still attach to the top plate, and the front face would still completely block the opening between the roof sheathing, rafters, and top plate.

The bolts holding down the roof sheathing can be carriage bolts, rivets, or screws. Carriage bolts work nice because one can drop them through the holes and the roof plate will prevent them from turning, so no one has to be up on the roof, and installation can be done by one person. Modern adhesives could also be used to hold the roof plate to the fire block, but metal bolts are more fire-proof.

The invention can be used on wood-frame, steel-frame, combination of wood and metal, composite-frame, or kit-type buildings.

Accordingly, the scope of the invention should be determined not by the embodiments illustrated, but by the appended claims and their legal equivalents.

I claim:

1. An apparatus for securing structural members of a building together comprising:

a. a unitary body having a substantially rectangular face, with bends and tabs;

b. a side bend extending at an approximately right angle from each short side of said rectangular face, said side bend forming a rafter tab for attachment to a vertical edge of a rafter;

c. each of said rafter tabs having a spacer web extending from a bottom edge of said rafter tab at an oblique angle;

d. each of said spacer webs having a plate web extending from a bottom edge of said spacer web at an approximately right angle relative to the planar surface of said rafter tab for attachment to a top plate;

e. said rectangular face having bends on the long top side forming sheathing tabs for attachment to a roof sheathing; and f. each of said sheathing tabs having a bend forming a gusset.

2. The apparatus of claim 1 wherein said rectangular face having a predetermined length as a spacing means between adjacent rafters according to a predetermined construction dimension.

3. The apparatus of claim 1 wherein a lower portion of said rectangular face having a plurality of nail holes as an attaching means to the vertical side of a wall and underlying plates of a top plate.

4. The apparatus of claim 1 wherein said rectangular face having a substantially solid and predetermined area as a means of completely covering an opening between adjacent rafters, a top plate, and roof sheathing on a house, thereby keeping flames out of said house and providing means for inhibiting a chimney-effect therein.

5. The apparatus of claim 1 wherein said rafter tabs having a predetermined area and a plurality of nail holes as a means of attachment to a vertical edge of two adjacent spaced-apart rafters, thereby connecting opposite faces of adjacent rafters together.

6. The apparatus of claim 1 wherein each of said spacer webs having a predetermined area as a means for providing deflection of each said plate web, thereby allowing said rectangular face to completely block said opening between said rafters, said top plate, and said roof sheathing.

7. The apparatus of claim 1 wherein each said plate web having a predetermined area and a plurality of nail holes as a means for attachment to a horizontal face of said top plate.

8. The apparatus of claim 1 wherein each said sheathing tab having said gusset bend on the outer edge of each said sheathing tab side as a means for having said gusset parallel and planar to said rafter tab thereby having attaching points to said rafter on the front and rear of said rectangular face.

9. The apparatus of claim 1 wherein said sheathing tabs and the top of said rectangular face having a predetermined area as a means for fitting tightly against the bottom of said roof sheathing, and said rafter tabs, said gussets, and sides of said rectangular face having attachment and tight fit against adjacent rafters, and said lower part of said face plate and said plate webs having attachment to adjacent sides of said top plate thereby forming a closed box-shape between said rafters, said top plate, and said roof sheathing, whereby said apparatus helps prevent hurricane, earthquake, and wildfire damage to a building.

10. An apparatus for securing structural members of a building together comprising:

a. a unitary body having a substantially rectangular face, with bends and tabs;

b. a side bend extending at an approximately right angle from each short side of said rectangular face, said side bend forming a rafter tab for attachment to a vertical edge of a rafter;

c. each of said rafter tabs having a spacer web extending from a bottom edge of said rafter tab at an oblique angle;

d. each of said spacer webs having a plate web extending from a bottom edge of said spacer web at an approximately right angle relative to the planar surface of said rafter tab for attachment to a top plate;

e. said rectangular face having bends on the long top-side forming sheathing tabs for attachment to a roof sheathing;

f. each of said sheathing tabs having a bend forming a gusset; and g. a separate roof plate having bolt holes.

11. The apparatus of claim 10 wherein each said sheathing tab having a predetermined area and a bolt hole as an attaching means through pre-drilled holes to the roof, to said roof plate on a roof, thereby forming a strong box-shape between said rafters, said top plate, and said roof sheathing.

12. The apparatus of claim 10 wherein said roof plate having a predetermined area and bolt holes as a means for placing and holding carriage bolts when inserted from above a roof.

13. The apparatus of claim 10 wherein said bolt holes of said roof plate having predetermined width between them as a means for spanning across said roof sheathing, top part of said rafter, and tying into said bolt holes of said sheathing tabs on adjacent apparatuses.

14. The apparatus of claim 12 wherein said carriage bolts having predetermined length and width as a means for penetrating said bolt holes of said roof plate, said pre-drilled holes in said roof sheathing, and through said bolt holes of said sheathing tabs when said apparatus is attached to adjacent rafters.

15. The apparatus of claim 12, wherein a nut having threads equal to said carriage bolt as a means for securing said bolts, said roof plate, said roof sheathing, and said sheathing tabs together.

16. The apparatus of claim 10 wherein said roof plate, said sheathing tabs, said gussets, said rafter tabs, said plate webs, and said rectangular face form a closed box-shape against adjacent rafters, roof sheathing, and top plate, thereby preventing uplift, thrusting, and lateral movement of a roof and wall during high winds and earth movements.

17. The apparatus of claim 10 wherein said roof plate, said sheathing tabs, said gussets, said rafter tabs, said plate webs, and said rectangular face form a strong closed box-shape against adjacent rafters, roof sheathing, and top plate, thereby preventing the entrance of fire to a house due to the elimination of chimney-effect.

* * * * *